United States Patent [19]

Clemens

[11] 4,214,987
[45] Jul. 29, 1980

[54] TWO STAGE WASTEWATER FLOTATION

[75] Inventor: Ogden A. Clemens, Downers Grove, Ill.

[73] Assignee: Dravo Corporation, Pittsburgh, Pa.

[21] Appl. No.: 954,360

[22] Filed: Oct. 25, 1978

Related U.S. Application Data

[63] Continuation of Ser. No. 752,907, Dec. 21, 1976, abandoned.

[51] Int. Cl.$^2$ ............................ B03D 1/00; C02C 5/02
[52] U.S. Cl. ......................................... 210/44; 210/53
[58] Field of Search ............................. 210/44, 51–53, 210/221 M, 221 P

[56] References Cited

U.S. PATENT DOCUMENTS

| | | | |
|---|---|---|---|
| 3,510,001 | 5/1970 | Baer et al. | 210/44 |
| 3,723,712 | 3/1973 | Komline et al. | 210/85 |
| 3,783,114 | 1/1974 | Ishii et al. | 210/44 |
| 3,959,131 | 5/1976 | Ramirez et al. | 210/44 |
| 4,012,319 | 3/1977 | Ramirez et al. | 210/44 |
| 4,108,768 | 8/1978 | Sebelik et al. | 210/44 X |

Primary Examiner—Thomas G. Wyse
Attorney, Agent, or Firm—Parmelee, Miller, Welsh & Kratz

[57] ABSTRACT

In a first stage, a flow of wastewater is adjusted to near zero streaming potential by injecting a mineral acid into the wastewater. The thus adjusted flow enters a basin where it is subjected to a decreasing gradient of small bubbles to form and separate off a first buoyant floc from the flow of wastewater. The flow of wastewater then passes to a second stage. In the second stage, a metal coagulant is injected into the wastewater, and the wastewater and coagulant enter a coagulation cell into which dense quantities of bubbles are supplied. Buoyant composites of particulates, coagulant and bubbles are formed in the cell. These composites leave the cell together with the wastewater flow and enter a second flotation basin where a second buoyant floc is separated off. The first and second floc combined have a higher solids content, have a lesser relative volume, and have physical properties such that valuable materials are more readily recovered therefrom than from a floc that would be formed if the wastewater were subjected to the second stage only.

11 Claims, 4 Drawing Figures

TWO STAGE WASTEWATER FLOTATION

This is a continuation of application Ser. No. 752,907 filed Dec. 21, 1976, now abandoned.

This invention relates to an improved method for floating particulates from a wastewater in two stages.

The use of small diameter bubbles to float impurities from a wastewater has been known as a valuable tool in reducing the level of particulates in municipal and industrial wastewaters. For example, in copending Ramirez allowed U.S. Ser. No. 636,513 now U.S. Pat. 4,012,319, which is hereby incorporated by reference herein, there is disclosed the use of a decreasing gradient of bubble densities to float particulates. Wastewaters generally contain suspended, charged particulate matter which will not settle out even if allowed to stand for months on end. These particulates usually carry an electrostatic charge, and it is recognized that in order to precipitate these particulates, their charge must be substantially reduced.

In publications such as Komline et al, U.S. Pat. No. 3,723,712, and Carlson, U.S. Pat. No. 3,594,313, negatively charged wastewater particules are reduced to particles having approximately zero charge by adding to the wastewater quantities of coagulants that provide positive charges, such as metal chlorides, sulfates or salts. It is also known, for example, from these two patents, that optimum particle charge reduction is accomplished when the zeta potential of the wastewater is adjusted and maintained near a zero value. Generally, in these publications the metal coagulants serve to neutralize the charge on the particles and to coalesce them. It is also known that these coalesced particles will form a buoyant floc when brought into contact with small bubbles. The buoyant floc may then be removed from the surface of the thus clarified wastewater. These floc that are removed are referred to herein as skimmings.

It has been found that systems which use significant amounts of metal coagulants are hampered in their effectiveness by the formation of metal hyroxides that are collected in the skimmings. These metal hydroxides unfortunately bind not only the particulates but also substantial quantities of water so that the skimmings contain about 95% water, meaning that the solids content of the skimmings is especially low. These binding properties also tend to increase the effort needed to "render" the skimmings when it is desired to recover valuable materials such as minerals, proteins, fats and oils present in the raw wastewater. Metal coagulants also tend to taint the recovered materials with residue from the metal coagulants and result in recovered products that have an undesirable color and/or odor.

Also, the use of metal coagulants produces a relatively large volume of skimmings, on the order of 2 to 5 volume percent of the wastewater treated. Likewise, the metal coagulants themselves are particulate matter which add to the total suspended solids content of the wastewater. Another disadvantage is that the cost of metal coagulants is high when compared with the cost of inorganic acids.

It has now been determined that superior wastewater clarification can be accomplished by a two stage process, the first stage including adjusting the streaming potential of the wastewater to near zero by adding an inorganic acid and subsequently floating the particulates of reduced charge. This is then followed by a second stage which further treats the water separated in the first stage. The second stage includes the use of metal coagulants. The second stage includes the use of a coagulation cell into which a low concentration of metal coagulant and dense quantities of bubbles are provided, followed by a second flotation basin. This second stage uses manipulative steps and apparatus such as is disclosed in U.S. Pat. Nos. 3,959,131, 3,969,245 and 3,975,269, the disclosure of each of these patents being hereby incorporated herein by reference.

It has also been determined that, quite unexpectedly, an embodiment of the method and apparatus of this invention can cause significant reduction in the content of ions in wastewaters by transferring significant amounts thereof into the skimmings. While it is believed that this phenomenum itself had been at work, unrecognized, in systems according to the allowed application and three patents incorporated herein by reference, this particular embodiment of the present invention accomplishes, in the first stage alone, even better ion removal than that of these systems.

Accordingly, an object of this invention is an improved method for removing appreciable quantities of charged particulates from a wastewater in two distinct stages, the first stage using no metal coagulants to form a first buoyant floc, followed by a second stage that uses metal coagulants to form a second buoyant floc, the combined first and second buoyant floc being readily renderable, being of increased solid to liquid ratio, and being of reduced relative volume.

It is a further object of the invention to provide an improved method to clarify wastewaters by means of forming buoyant floc skimmings having improved color and odor properties.

One other object of this invention is an improved method for clarifying wastewater by separating out buoyant skimmings containing a large percentage of particulates, while maintaining the volume of the total skimmings formed and collected at a low percentage of the total wastewater treated.

An object of one embodiment of this invention is the provision of an improved process that accomplishes significant reductions in the content of ions in wastewater simultaneously with the removal of particulates.

This invention is an improved two stage method for floating materials out of wastewaaters. In the first stage, a flow of wastewater containing charged particulate matter is adjusted to near its zero streaming potential value by adding an inorganic acid. The adjusted wastewater flow is then directed to a confined location containing dense quantities of small bubbles, followed by a passage into a long flotation zone. A first buoyant floc is removed from the wastewater in this first flotation zone. The wastewater then enters a second stage which includes the addition of a metal coagulant to the wastewater and a passage through a coagulation cell by which composites of particulates, bubbles and coagulant are formed within the wastewater flow. This flow then passes to a second flotation basin for separation of a second buoyant floc from the further clarified wastewater.

Additional objects, if not set forth specifically herein, will be readily apparent to those skilled in the art from the detailed description of the invention which follows and from the drawings in which.

Figure 1:
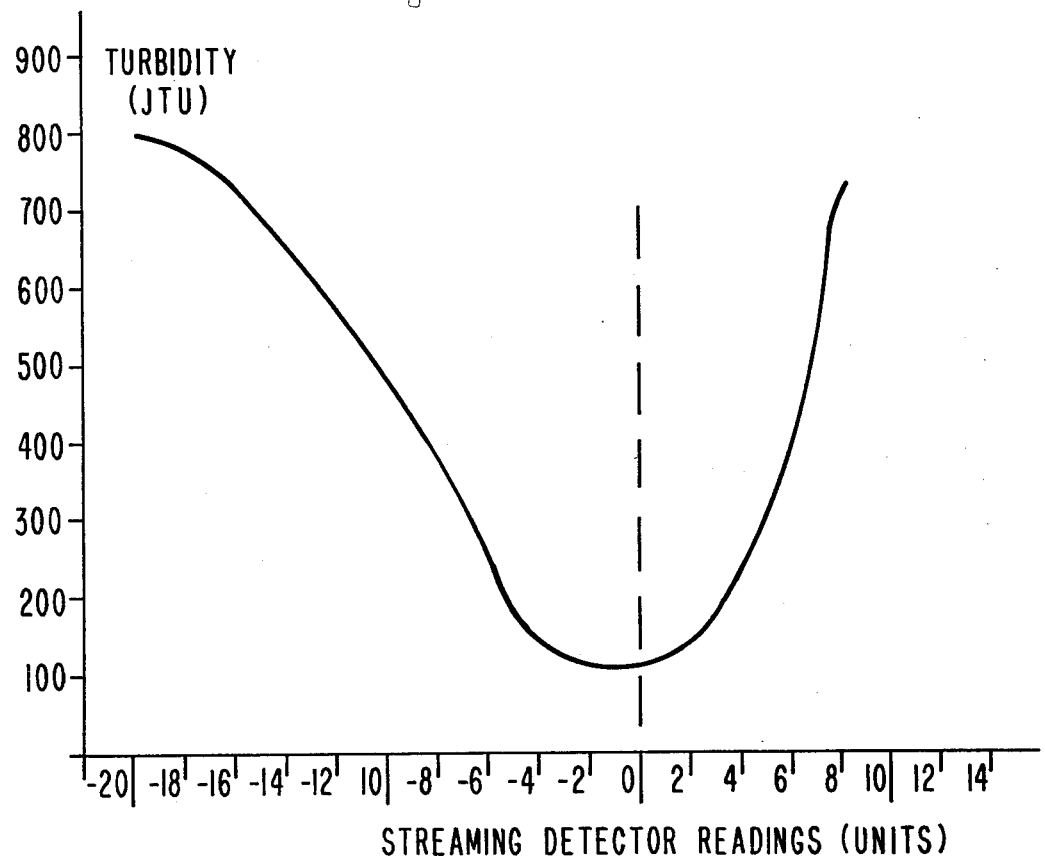
FIG. 1 is a plot of streaming potential values against turbidity.

The method of this invention accomplishes the removal of charged particulates and coagulable material from a flow of wastewater. The first stage of the method includes many of the features disclosed in a copending application of Ramirez filed on the date of this application and entitled "Wastewater Flotation Utilizing Streaming Potential Adjustment".

In the first stage, the water to be treated is mixed with a quantity of mineral acid to adjust the streaming potential of the wastewater to near zero. The thus adjusted wastewater flows into a confined location wherein it is combined with a dense supply of small bubbles that form buoyant gas-particulate composites. The wastewater and composites then flow together upwardly and over an impermeable barrier and into a long flotation zone for separating off a first buoyant floc. First clarified wastewater exits from the bottom of the downstream end of the flotation zone and passes on to the second stage. The second stage floats off materials remaining within the first clarified wastewater. It uses a coagulation cell and a flotation basin as disclosed in the three patents incorporated herein by reference, and especially in those embodiments of U.S. Pat. No. 3,959,131 where a metal coagulant is added just upstream of the coagulation cell. This second stage forms and separates a second buoyant floc, generally resulting in a water having fewer particulates than a wastewater that has been passed through the first stage only.

More particularly, the preferred method of the first stage treats wastewaters having a net zeta potential charge. Most wastewaters have a net charge that is negative so that a mineral acid is added to bring the wastewater to approximately zero streaming potential. The preferred mineral acid is sulfuric acid. Other suitable mineral acids include hydrochloric acid. A wastewater that might have a net streaming potential that is positive would call for the addition of a mineral base. The preferred mineral base is calcium hydroxide. Other suitable mineral bases include sodium hydroxide.

With the streaming potential near zero, the particulates are no longer charged or carry only very low charges. This means that the charge repulsion present among the particulates prior to treatment has been removed or at least substantially lessened. Without this adjustment, the particulates will remain dispersed throughout the wastewater and will be resistant to the bubble treatments of the subsequent steps. The streaming potential adjustment markedly increases the tendency of the particulates to unite and grow with the small bubbles to form the skimmings without having to use metal coagulants.

In the next step of this method, the streaming potential adjusted wastewater flows into the confined location having a continuous supply of bubbles. The density of this supply is such that the bubbles comprise ½ to 1-½ volume percent of the wastewater in the confined location to efficiently form the buoyant gas-solid composites. These bubbles may be provided by electrolytic decomposition of wastewater or by pressurized gas dissolution. Dissolved gas bubbles are preferred because of their lower cost and smaller average size.

While dissolved gas is used in the preferred embodiment, an alternate embodiment employes electrolytic bubbles which have a particular advantage in that they result in a marked reduction in the amount of ions that might be present in the raw wastewater. Such ions include ammonia-nitrogen, cyanide, phenol, polybrominated biphenyls, various other organic toxic pollutants, and valuable minerals such as molybdenum, uranium, etc. The reduction is significant, with these ion values being found in the skimmings. The degree of reduction is reported elsewhere herein as a partition coefficient, defined as the concentration of ions in the skimmings phase over the concentration of ions in the mother liquor, here the wastewater. This feature results in a partition coefficient in excess of 30/1 during the first stage. In the second stage, a further reduction of about 10% of the ion content remaining in the wastewater is usual.

The reason for this highly beneficial phenomenon is not presently known. The following is offered as an hypothesis. Hydrogen bubbles appear to act as a catalyst in that they attach to the particulates to form the two-phase composites, hydrogen being the gas phase. It is postulated that ions are then adsorbed, either physically, chemically, or by ion exchange, onto the solids at the gas-solid interphase. When these two-phase composites enter the skimmings later on in this method, these values are thus removed from the wastewater. It is further postulated that some ions that are not so adsorbed are destroyed by electrolytic action.

In an optional step of the first stage, a polymer flocculant may be added into the confined location while the composites are being formed and before the mixture passes over the impermeable barrier to initiate the separation procedure. This feature is not essential, but it usually noticeably improves the consistency of the overall process by increasing the stability of the composites formed, making them less susceptible to being damaged during the subsequent separation procedure. Any polymer flocculant may be used in concentrations beteen about ½ and 15 ppm. The preferred polymers are polyelectrolytes in the form of polyacrylic acrylamides, which are copolymers of from about 50 to 90 weight percent acrylamides or methacrylamides, and from about 10 to 50 weight percent acrylic or methacrylic acid or water soluble salts thereof. These polymers are characterized by weight average molecular weights of about 2 million and usually the molecular weights range between about 7 to 12 million as measured by light scattering techniques. The preferred concentration range for the polymer flocculant is between about 1 to 3 ppm.

Irrespective of the makeup of the gas-solid composites formed in the preceding steps, the next step in the first stage of the present method begins the process of separating the two-phase composites from the wastewater. The wastewater and the composites mixed therein flow together out of the confined location by passing over the impermeable barrier into the long flotation zone. Preferably, additional bubbles are provided from the bottom of the upstream portion of the zone for assisting in the flotation separation of the composites. The long flotation zone also preferably includes a downstream, or quiescent, portion into which no bubbles are supplied. The volume of bubbles in the upstream portion is generally about 3 to 10 times the volume of bubbles in the downstream quiescent portion.

When, as preferred, bubbles are added from near the bottom of the upstream portion, the additional bubbles are preferably supplied by electrolytic decomposition of water. They also may be provided by gases dissolved in water. These bubbles should be provided in a pattern that gradually decreases in density in the downstream direction. Best results have been observed when the decrease is geometric. In any event, the decrease should be such that the bubble density at the upstream end of the long flotation zone is 2 to 5 times greater than the bubble density at the mid-line of the zone.

In an alternative embodiment, no additional bubbles are added at the bottom of the long flotation zone. Instead, excess bubbles are added within the confined location so that significant amounts of free bubbles unattached to particulates flow over the impermeable barrier and down into the long flotation zone. Substantial quantities of these free bubbles flow toward the bottom of the flotation zone, especially at its upstream end, thereby approximating but not equalling the affect that is achieved by the added gradient bubble supply. This alternate embodiment is assisted greatly by including vertical, perforated baffles within the long flotation zone. It is also improved as the sizes of the free bubbles decrease, since smaller bubbles rise slower than large bubbles and are more likely to flow toward the bottom of the zone.

Often the desired bubble density can be achieved by providing the bubbles in a number of stages, preferably in four quartile stages. For example, when the bubbles are supplied electrolytically, one can express the bubble density as the average amount of amperage supplied per square foot of each quartile, calculated based on the floor area covered by the quartile stage. In the preferred quartile arrangement, the first, upstream quartile current density is between about 7.5 to 20 amperes per square foot; in the second quartile it is between about 3.75 to 10 amperes; in the third quartile it is between about 1.875 to 5 amperes; and in the fourth, quiescent quartile, no current is supplied.

Within the long flotation zone as a whole, the mixture passing over the impermeable barrier is separated, the composites rise to the surface to form the first buoyant floc skimmings, and the wastewater flows the length of the zone and out at the downstream end of the quiescent portion. In the preferred process, vertical, perforated baffles are placed transverse to the flow throughout the long flotation zone. The baffles permit from 50 to 60 percent free passage downstream through the zone. They significantly reduce turbulence, channelling and back diffusion within the zone which would develop if the baffles were not present and which would cause disruption of the separation process to decrease the final clarity of the wastewater leaving the first stage.

In the second stage of the present method, the water flowing out of the quiescent portion of the long flotation zone of the first stage is then subjected to the second stage using metal coagulants and a dense supply of bubbles to form a buoyant composite of particulates, bubbles, and coagulant mixed within the wastewater flow, followed by a subsequent second flotation step, all as particularly disclosed in the three patents incorporated herein by reference, especially in U.S. Pat. No. 3,959,131. This second stage can remove even further particulates from the wastewater. This particular combination of the present invention has the advantage of providing especially clear water without excessive use of metal coagulants or polymers, while forming lower volumes of skimmings that would be formed by conducting the second stage alone. More particularly, only about 50 ppm to 350 ppm of a metal coagulant are added, preferably about 100 ppm to 200 ppm.

Figure 2:
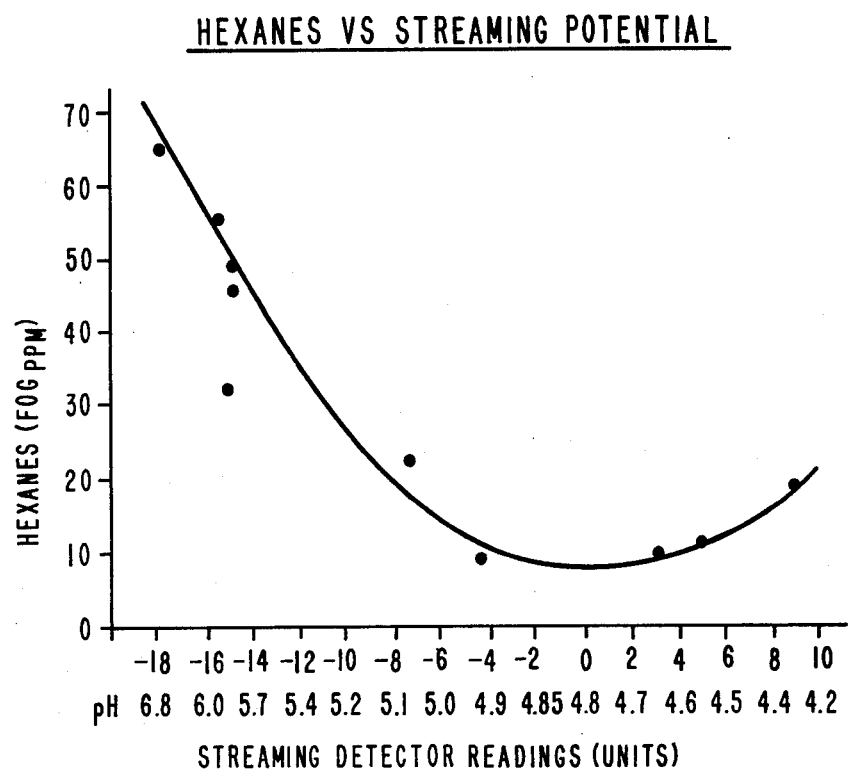
FIG. 2 is a plot of streaming potential values against hexanes analyses

FIGS. 1 and 2 illustrate the relationship, recognized in the first stage of this invention, between streaming potential values and wastewater clarification. The readings are reported in streaming detector units which are qualitative approximations of zeta potential values measured on a detector manufactured by Water Associates, Inc. of Framingham, Mass. There is a precise relationship between streaming units and zeta values, disclosed, for example, in *Encyclopedia of Electrochemistry*, editor Clifford A. Hampel, Reinhold Publishing Corporation, New York, N.Y., 1964, at page 384.

FIG. 1 illustrates the effects on turbidity (measured in Jackson turbidity units) when a particular meat packing wastewater is treated with sulfuric acid and 12 ampere-minutes per gallon of treated wastewater are applied at various streaming potential units. The greatest clarity results when the streaming potential is zero. FIG. 2 illustrates the effect on hexane extractables or FOG (fats, oils and greases) values when a meat processing wastewater is subjected to treatment according to this process except that streaming potential values other than zero are used. The lowest hexane values occur when the streaming potential meter reading is near zero. These figures illustrate that there is a maximization of treatment of these wastewaters at zero streaming potential, with increasingly poorer results occurring when the streaming potential increases, either negatively or positively.

Table I illustrates that there is a wide variation, from wastewater to wastewater between the pH and the streaming potential of the raw wastewater and the pH of that wastewater at zero potential. One would adjust to the pH listed in the last column to adjust to approximately zero zeta potential in accordance with the first stage of this process.

TABLE I

| General Type of Wastewater | Raw Wastewater pH | Streaming Detector Reading | pH of Wastewater at Zero Streaming Current |
|---|---|---|---|
| Brewery | 3.8 | +2.6 units | 4.2 |
| Beef packing and marinating | 5.0 | +2.2 units | 6.2 |
| Meat packing | 6.5 | −10.0 units | 3.5 |
| Metal processing | 8.5 | −10.0 units | 2.8 |
| Meat packing | 7.0 | −16.6 units | 4.3 |
| Meat packing | 7.0 | −19.4 units | 4.5 |
| Oil barrel manufacture | 8.2 | −37.0 units | 3.7 |
| Shortening manufacture | 11.5 | −51.0 units | 3.4 |

Figure 3:
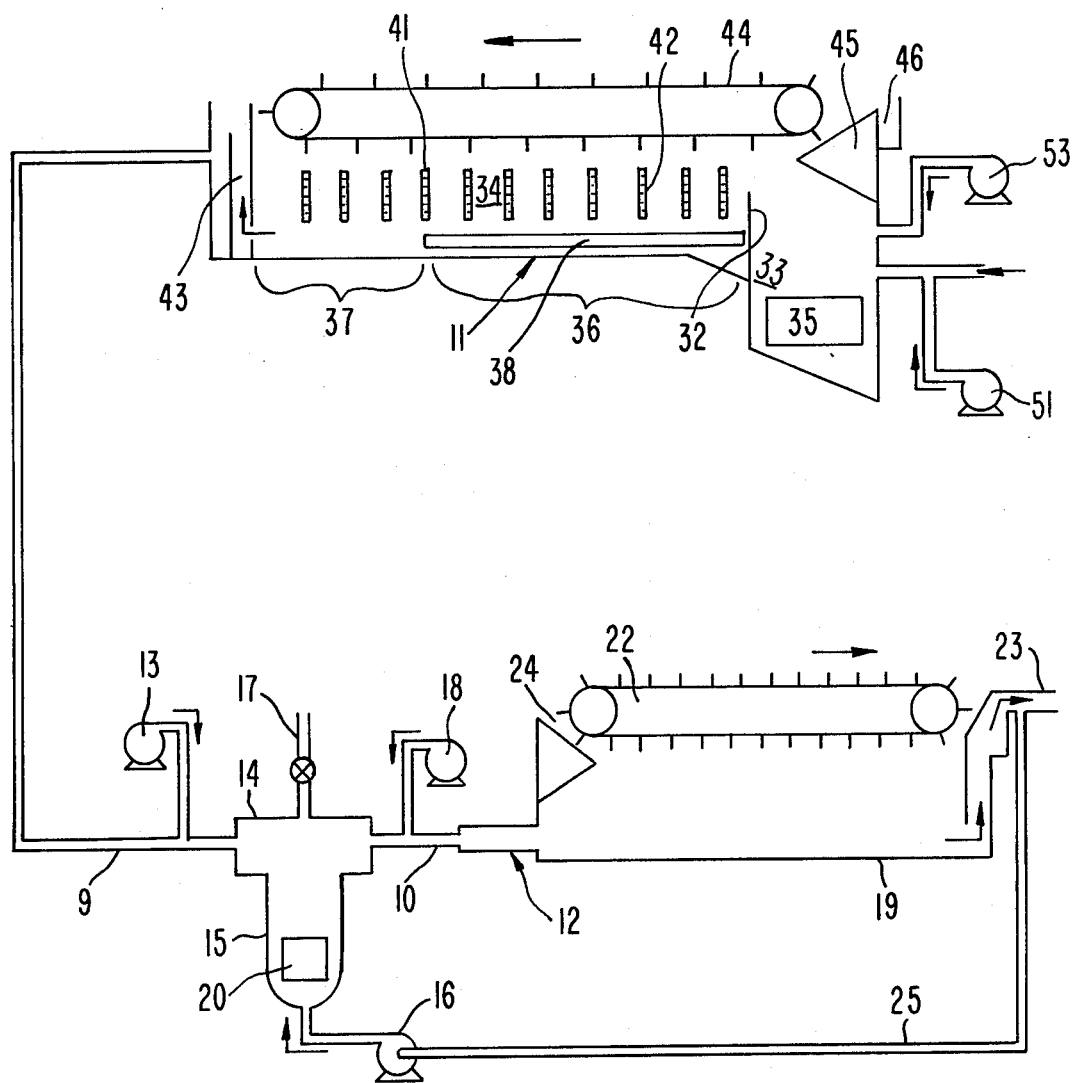
FIG. 3 is a schematic view of the preferred two stage apparatus of this invention.

FIG. 3 is a schematic view of the preferred apparatus. The apparatus includes the first stage means, generally referred to by reference numeral 11 and the second stage means, generally referred to by reference numeral 12. The structure shown and the reference numerals used in describing specific portions of second stage means 12 have the same meaning and relate to the same structural features shown by like reference numerals in the disclosure and in FIG. 1 of U.S. Pat. No. 3,959,131. A conduit 9 communicates the first stage means 11 with this second stage means 12.

In the first stage means 11, an impermeable baffle 32 separates chamber 33 from basin 34. Chamber 33 includes a means, generally referred to by reference numeral 35, for providing dense quantities of gas bubbles for developing turbulent contacts with particulate matter within chamber 33. The gas bubbles may be supplied in any manner provided that they are small enough and dense enough to provide adequate contacts. Preferably, means 34 takes the form of a system for releasing gas bubbles dissolved under pressure into chamber 33. Alternately, means 35 may comprise a plurality of electrodes for electrolytically decomposing water within chamber 33.

Basin 34 has an upstream portion 36 and a downstream portion 37. Upstream portion 36 optionally may include a means 38 for supplying bubbles to float and separate composites formed in a chamber 33 from out of the wastewater. No bubbles are added in downstream portion 37; this provides a quiescent environment. The preferred bubble supply means 38 in the upstream portion 36 of basin 34 provides bubbles in quantities that decrease in the downstream direction. The object of this structure is separation. The means 38 may be a means for supplying dissolved gas under pressure and for releasing the dissolved gas into upstream portion 36. Alternatively, means 38 may be a plurality of electrodes. One other conventional bubble supply means, dispersion, is presently believed to be unsatisfactory for use as the means 38.

Perforated transverse baffles 41 may be provided throughout the basin 34. The perforations 42 are generally evenly distributed throughout each baffle and make up about 50 to 60 percent of the surface area of the baffles 41. It is also preferred that these transverse baffles 41 be spaced from each other a distance of approximately ¼ to ½ the width of the basin. Such perforated baffles 41 prevent turbulence, channeling, and back diffusion within the basin to thereby improve the overall effectiveness of this first stage of the apparatus. The preferred perforations are circles of diameters between about 2 inches and 3 inches. Other sizes and shapes are often adequate, for example, squares of 2 inches to 3 inches on each side, rectangles, triangles, or other polygons which allow for 50 to 60 percent free passage through the baffles 41.

Downstream of quiescent portion 37 is an outlet 43, which communicates with conduit 9, for passage of the first clarified wastewater from out of the bottom of the quiescent portion 37 of the basin 34. The first buoyant floc skimmings pass out of basin 34 with the assistance of a skimmings removal means such as a skimmer 44, a beach 45, and a trough 46. An injector 51 is provided upstream of the chamber 33 for introducing the chemicals needed to adjust the streaming potential of the wastewater to near zero. It is preferred that a holding means such as a holding tank (not shown) be provided at this approximate location so the streaming potential of the wastewater may be stabilized and verified if desired before the subsequent treatment steps. Alternatively, one or more injectors 53 may be provided to add a polymer flocculant into chamber 33 so as to increase the size and stability of the buoyant gas-solid composites formed within chamber 33.

The following examples are set forth as illustrative embodiments of the invention and are not intended to be taken in any manner as limiting the scope thereof as defined by the appended claims.

EXAMPLE I

A packinghouse wastewater was subjected to three different test treatments to illustrate the advantages obtainable by proceeding with the two stage process of the present invention within the preferred apparatus. The raw wastewater analyzed as follows: 1,000 ppm BOD; 700 ppm suspended solids; and 600 ppm fats, oils, and greases.

The first test subjected this wastewater to only the first stage of this invention. The wastewater was adjusted to about zero streaming potential, which occurred at a pH of 5.2. It was then subjected to electrolytically produced bubbles using 5 ampere-minutes per gallon of water treated. The treated water had the following qualities: 350 ppm total BOD; 150 ppm suspended solids; and 42 ppm fats, oils, and greases.

The second test proceeded only under the second stage of the process, using enough metal coagulant needed to coagulate the bulk of the materials within the wastewater. This required the addition of 600 ppm of ferric sulfate, along with 200 ppm of calcium hydroxide. The thus treated water was then mixed with large quantities of electrolytically produced bubbles, followed by 3 ppm of an anionic polyelectrolyte and by flotation. The thus treated water had the following properties: 150 ppm total BOD; 70 ppm suspended solids; and 15 ppm fats, oils, and greases.

In the third test, according to the present invention, the first stage was followed by the second stage. Once again, only the amount of metal coagulant that was found to be needed for treating the particulates in the first treated wastewater was added. It was added during the second stage. This amounted to only 150 ppm of ferric sulfate. The following results were observed: 110 ppm total BOD; 75 ppm suspended solids; and 18 ppm fats, oils, and greases. In this third test, significantly lower amounts of metal coagulant were used than for the second test. Still, the clarification achieved was at least as good as that of the second test. The skimmings, however, were more acceptable for subsequent further treatment, particularly a rendering operation, than were the skimmings from the second test because the fat and protein values in the skimmings of this third test were more easily recovered and showed less metal hydroxide contamination.

EXAMPLE II

Figure 4:
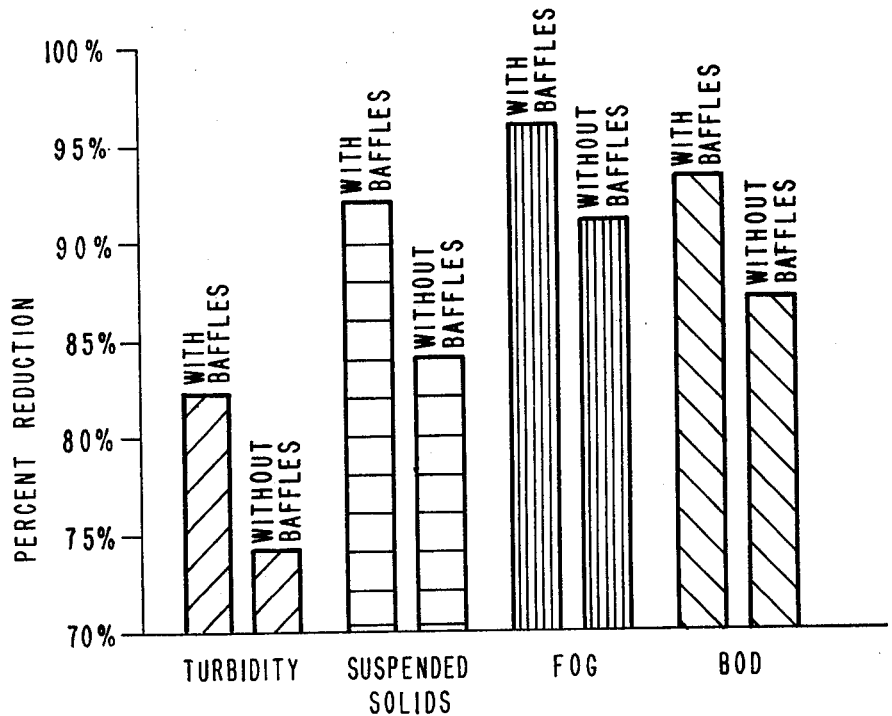
FIG. 4 is a bar graph representation of the tests reported in Example II.

Wastewater flows from a cattle and hog slaughtering plant had the following average pollutant loads: 5,080 ppm total BOD; 2,750 ppm suspended solids; and 1,950 ppm hexane extractables. The water was treated in a pilot plant scale apparatus in accordance with the first stage means of this invention. The test was run at a flow rate of 10 gallons per minute, using 14 ampere minutes per gallon of wastewater treated. One series of tests were run without baffles in the flotation basin, while another series of tests were run with transverse baffles in the basin, there being 11 perforated baffles having 1-½ inch diameter holes providing 50% free passage through the perforated baffles. The results, plotted in FIG. 4, show the improvement in clarification achieved in the first stage when the perforated baffles were employed when compared with the testing without the baffles. Also, when the baffles were used, the skimmings included 33% solids and 42% hexane extractables.

EXAMPLE III

Beef packinghouse wastewater, before being passed through a 20 gallon per minute pilot plant in accordance with the first stage of this invention, had the following characteristics: 1,010 ppm total BOD; 750 ppm total suspended solids; 400 ppm hexane extractables; and 30 ppm ammonia-nitrogen. This wastewater was adjusted to near zero streaming potential, the pH being at a value of 4.5. Using Duriron electrodes provided with an energy input of 10 ampere-minutes per gallon of wastewater treated, skimmings floated on the treated wastewater. This first stage treated wastewater had the following characteristics: 310 ppm total BOD; 90 ppm total suspended solids; 50 ppm hexane extractable; and 8 ppm ammonia-nitrogen. Analysis for ammonia-nitrogen in the first stage skimmings showed a 610 ppm content. This amounts to a partition coefficient of ammonia-nitrogen equal to 76/1.

More than 70 percent of the ammonia-nitrogen in the raw wastewater was concentrated into the skimmings, leaving only approximately 30 percent of the original ammonia-nitrogen in the wastewater for further treatment in the second stage. The second stage treatment brought about an additional reduction of 10% in the ammonium ion content of the wastewater.

EXAMPLE IV

A pork packinghouse wastewater with the following characteristics was treated in the 20 gallon per minute pilot plant of Example III: 1,441 ppm total BOD; 881 ppm total suspended solids; 482 ppm hexane extractables; and 19 ppm ammonia-nitrogen. This raw wastewater had a pH of 7.8. This wastewater was adjusted to near zero streaming potential with sulfuric acid, the pH reading being about 4.5. It was then passed through an electrolytic cell where Duriron electrodes were employed and wherein energy input of 11 ampere-minutes per gallon was applied. This resulted in only a 0.4 volume percent of the wastewater treated being converted to first stage skimmings. Dwell time was 30 minutes. The chemical characteristics of the wastewater leaving the first stage pilot unit were: 350 ppm total BOD; 120 ppm total suspended solids; 53 ppm hexane extractable; and 7 ppm ammonia-nitrogen. Reduction in ammonia-nitrogen values in the first stage effluent wastewater as compared to the raw wastewater was noted to be 63 percent. The value of ammonia-nitrogen content in the first stage skimmings was observed to be 530 ppm. The partition coefficient for ammonia-nitrogen was 75/1.

EXAMPLE V

Packinghouse wastewater containing 42 ppm of ammonia-nitrogen was treated with sulfuric acid to bring it to its zero streaming potential, which was found to be at a pH of 4.5. This wastewater was then treated with 11 ampere-minutes per gallon of electrolytic current wherein 90 percent of the suspended material was removed from the wastewater in the form of first stage skimmings. Analysis of the wastewater treated showed the ammonia-nitrogen value was reduced to 3.7 ppm. This corresponds to a 91 percent reduction in ammonia-nitrogen values of the first stage treated wastewater.

EXAMPLE VI

Wastewater used for the beneficiation of molybdide ores containing appreciable amounts of heavy metals and 0.55 ppm of cyanide values was subjected to second stage treatment. This water was treated with 100 l ppm of alum and subsequently processed with 8 ampere-minutes per gallon of electrolytic power. Analysis of the effluent waters showed that more than 90 percent of the heavy metals (copper, zinc, cadmium, iron, manganese) were removed, and that the cyanide value of 0.55 ppm was reduced to 0.07 ppm, an 86 percent reduction.

Obviously, many modifications and variations of the invention as hereinbefore set forth may be made without departing from the spirit and scope thereof, and only such limitations should be imposed as are indicated in the appended claims.

I claim:

1. A method for removing particulates from wastewater, wherein said particulates comprise proteins, fats, oil or minerals by flotation, to produce readily recoverable skimmings, comprising: a first stage, said first stage including adjusting the streaming potential of a wastewater to approximately zero, in the absence of any added trivalent metal coagulant compound and by the use of an inorganic acid or base, forming a flow path of the thus adjusted water to a confined location, supplying dense quantities of small bubbles within said confined location, entering overflow from the confined location into a long flotation zone, forming a buoyant first floc in the long flotation zone, and separating the first floc from a first treated wastewater; and a second stage including adding a metal coagulant to said first treated wastewater, introducing the wastewater and coagulant into a compact and dense zone of fine bubbles originating from a bubble supply, churning the first treated wastewater with said bubbles to form aggregates of bubbles, coagulant and particulates, said aggregates remaining unseparated from the wastewater flow, flowing substantially all of the wastewater flow together with the unseparated aggregates out of said zone, introducing the aggregates and wastewater into a second flotation zone to permit the aggregates to rise to the surface of the wastewater and form a second buoyant floc, and separating the second flock from the wastewater.

2. The method of claim 1, wherein said adding step of the second stage adds coagulant to a concentration between about 50 ppm and 350 ppm of the first treated wastewater.

3. The method of claim 1, further comprising a partial baffling step in said long flotation zone to reduce turbulence, channeling and back diffusion by permitting free passage of about 50 to 60 percent of the flow through the long flotation zone.

4. The method of claim 1, said wastewater also including ion values, at least one of said bubble supplying steps including supplying hydrogen bubbles, and at least 50 percent of the ions being removed from the wastewater.

5. The method of claim 1, further comprising adding about one half to 15 ppm of polyelectrolyte flocculant to the confined location during said first stage.

6. The method of claim 1, further comprising adding about one half to 15 ppm of polyelectrolyte flocculant to the wastewater flow after said flowing step of the second stage.

7. The method of claim 1, wherein the first stage steps of forming and separating buoyant floc includes supplying bubbles formed electrolytically or by release of pressurized, dissolved gas bubbles within an upstream portion of the long flotation zone, the volume of bubbles in said upstream portion being about 3 to 10 times greater than the volume of a quiescent portion of the long flotation zone.

8. The method of claim 1, wherein at least one of the steps of forming and separating buoyant floc includes providing bubbles decreasing in density in the downstream direction.

9. The method of claim 1, wherein at least one of the steps of forming and separating buoyant floc includes forming bubbles electrolytically and supplying said bubbles in four quartile stages, the most upstream stage having a current density between about 7.5 to about 20 amperes, the second quartile stage having a current density between about 3.75 to about 10 amperes, the third quartile stage having a current density between about 1.875 to about 5 amperes, and the fourth, most downstream stage having no current supplied, said current densities being the average amount of amperage supplied per square foot of each quartile, calculated based on the floor area covered by each quartile stage.

10. The method of claim 1, wherein at least one of the steps of forming and separating buoyant skimmings includes supplying bubbles to develop a bubble density at the most upstream end that is 2 to 5 times greater than the bubble density at the mid-line of the flotation zone.

11. The method of claim 1, wherein said first stage steps of supplying dense bubbles, entering the long flotation zone, forming buoyant first floc and separating the first floc together provide a gradient of bubble densities that gradually diminish in density, the greatest density being at the influent end; contacting said flowing wastewater with said gradually diminishing gradient; and creating high water turbulence within the wastewater only at the infuent end, said high water turbulence being created and maintained within the confined location by dense quantities of small bubbles formed by said influent end greatest bubble density.

* * * * *